Oct. 22, 1963 H. BUGGE 3,107,872

DRIVING DEVICE FOR SOUND RECORDING AND REPRODUCING APPARATUS USING SOUND CARRIER TAPES OR WIRES

Filed Aug. 17, 1960

Jnventor:

Harry Bugge

United States Patent Office 3,107,872
Patented Oct. 22, 1963

3,107,872
DRIVING DEVICE FOR SOUND RECORDING AND REPRODUCING APPARATUS USING SOUND CARRIER TAPES OR WIRES

Harry Bugge, Berlin-Schoneberg, Germany, assignor to Loewe Opta Aktiengesellschaft, Berlin, Germany, a company of Germany Filed Aug. 17, 1960, Ser. No. 50,300
Claims priority, application Germany Aug. 22, 1959
5 Claims. (Cl. 242—55.12)

The invention relates to an advantageous structure for magnetic sound recording and reproduction and represents a further development of the driving device already suggested by applicant for sound recording and reproducing apparatus using sound carrier tapes or wires, e.g., for appliances with sound carrier cartridges.

In this prior arrangement there is a driving device with an intermediate disc arranged between drive disc and turn-table disc, carrying a coupling link and with this coupling link and the drive disc connected in such a way that the coupling link is engaged with the intermediate disc by rotation of the drive disc and, in the wind-up direction, couples the turn-table disc to the drive disc by friction effect whilst, on rotation of the drive disc in the opposite direction, i.e., for winding-off direction, the coupling link runs idle, i.e., does not exercise any friction coupling effect. The advantage of this driving device lies in the fact that, in contrast to the usual friction slide couplings between drive disc and turn-table disc respectively, this disc can move freely when turning in the wind-off direction without its movement being affected by the friction coupling connecting it to the drive disc. These driving devices are, for example, especially suitable for those magnetic sound recorders which have freely mounted spools arranged in the spool cartridges in such a way that the wound-up tape rests on the inner base of the spool cartridge and that for winding-off the tape is kept tight in the manner desired. Applicant's prior driving device is characterized in that the coupling link consists of a double lever 8, rotatably mounted to the intermediate disc 4, e.g., by means of a pin 9 arranged in parallel to the spindle around which said intermediate disc, said drive disc, and said turn-table disc are rotating (see FIG. 1). On rotation of the drive disc in the wind-up direction, a coupling element sliding on the spool or turntable disc with friction is driven via pin 13, double lever 8 and disc 4, and thereby also the spool or turntable disc is driven by the friction effect whilst, in the opposite direction of rotation (wind-off of the spool), a coupling effect does not occur owing to the radial displacement of the double lever outwards (see FIG. 1).

As in the prior driving device it is suggested that the one end of the double lever 8 is fitted with a piece bent upwards to form a right angle in order to bring about the coupling effect and the engagement respectively of the coupling element sliding on the spool disc by friction.

In accordance with the present invention the friction coupling element is formed as an adjustable coupling sleeve or muff, the friction surface lying in parallel to the spindle for the spool or turn-table disc.

The spool or turn-table disc can be constructed in the form of a hollow cylinder open at the bottom and fitted with a hub and the coupling element sliding on this hub as a coupling sleeve. Here, the hub of the spool disc is best fitted on its external surface with a steel jacket on which the coupling sleeve slides with a suitable friction lining being used as intermediate element. The friction effect of this coupling sleeve is made adjustable according to a further feature of the invention, for example, by a screw joint and/or use of a spring intermediate link, e.g., a spiral spring, between the two halves of the coupling sleeve.

Instead of a coupling sleeve, the arrangement can be simplified by extending the one end of the double lever between spool or turn-table disc 1 and intermediate disc 4 outwards so that by means of a part bent to a right angle, the friction coupling effect is exerted on the outside of the spool or turn-table disc when the drive disc 2 turns in the direction of winding-up the tape (see FIG. 3). The wind-up direction is shown in the diagram by an arrow.

The driving device according to the invention is explained in detail by means of examples shown in the diagrams.

Figure 1:
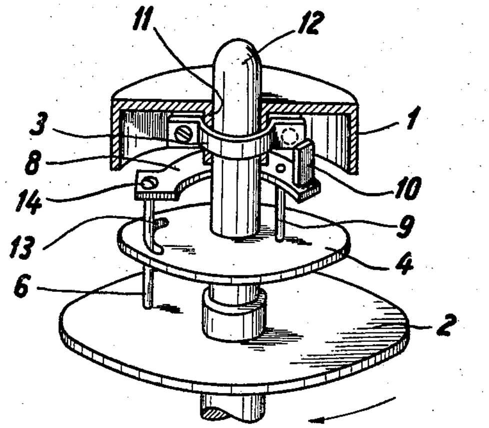
FIG. 1 is a perspective view partially in section of the driving device according to the invention using a coupling sleeve.

In FIG. 1, 1 represents the spool or turn-table disc in the form of a hollow cylinder open at the bottom and 2 the drive disc which is driven in the known manner by a motor omitted from the drawing for reasons of simplicity. Both parts 1 and 2 are guided on their common spindle 12 and can rotate freely around this spindle. Likewise freely rotatable on spindle 12 is an intermediate disc 4 fitted between drive disc 2 and spool or turn-table disc 1 and having an arcuate slot 13 concentric to the spindle 12. Here, it must be pointed out that the drawing in FIG. 1 is extended in the vertical direction for reasons of clarity. In reality, the parts shown should be pictured closer together in the vertical direction.

A pin 9 is attached on the disc 4. This pin serves as the bearing for the uneven double armed lever 8 which is rotatable around this pin 9. The longer lever arm of this double lever 8 has a longitudinal hole 14 into which a pin 6 attached to the drive disc 2 projects. This longitudinal hole 14 is necessary owing to the reciprocally varying distance of the pins 6 and 9 and permits the pin 6 to move with the double lever 8. The end of the shorter arm of this lever 8 is fitted with a part 10 bent upwards to form a right angle so that this bent part 10 projects into the spool disc 1 open at the bottom.

When the drive disc turns in the direction of tape wind-up as shown by the arrow (in a clockwise direction), the double lever 8 is likewise turned in this direction around pin 9 by means of pin 6 and, on further turning, engages the disc 4 after striking on the back edge of the arcuate slot 13. On this rotation of the double lever around the pin 9, the bent part 10 moves radially inwards with relation to the spindle 12 and, on further rotation with the tape still being wound up, hits against the coupling sleeve 3 on its left hand side and thereby engages this coupling sleeve. In turn, this coupling sleeve exerts a friction coupling effect on the hub 11 of the spool disc by means of a brake lining fitted within the coupling sleeve and thus, with this direction of rotation, the drive disc 2 (tape wind-up direction) engages this spool disc.

With the movement of the drive disc 2 in the opposite direction, i.e., with the wind-off movement of the sound carrier, the double lever 8 is likewise swivelled in the new direction around the pin 9 via pin 6 with the bent piece 10 of the double lever 8 moved radially outwards in relation to the spindle 12. The shorter end of the double lever 8 with part 10 is so dimensioned that, in this case, part 10 can move freely around the coupling sleeve 3, i.e., therefore, an engagement of the coupling sleeve is not possible by means of part 10 with this direction of movement. In this case, i.e., tape wind-off, the spool disc 1 accordingly moves freely on the spindle 12 unaffected by the drive disc 2. It can then be seen that by means of the arrangement according to the invention, it is possible in a highly simple way to have the spool or turn-table disc 1 run freely or exercise a drive effect via a friction coupling according to the direction of movement, as is necessary for magnetic sound recorders with the drive always running in one direction.

Figure 2:
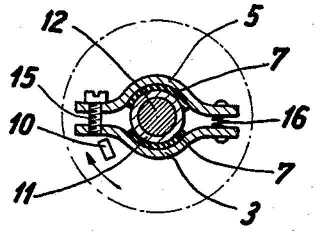
FIG. 2 is a cross-section of the coupling sleeve with its chief parts, whilst

In FIG. 2, the coupling sleeve with its clamps 3 and 5 can be clearly seen. These clamps 3 and 5 of the coupling sleeve embrace the hub 11 of the spool disc 1—best fitted on its external surface with an external steel jacket—with a friction lining 7 acting as intermediate connection. Again, this hub runs freely on the spindle 12. The friction coupling effect of this sleeve is adjustable by means of a screw 15 and here a spiral spring 16 should best be used to keep together the two other ends of the clamps 3 and 5 on the other side of the sleeve. It is also possible to replace the screw 15 by a similar spiral spring so that the friction coupling effect is solely dependent on this spring tension. Naturally, it is more advantageous to be able to regulate this friction coupling effect by means of a screw or similar device.

FIG. 2 shows the moment when part 10 hits against the left hand end of the clamp 3 in the direction of the arrow and so engages with this in the wind-up direction. With movement in the opposite direction, part 10 is moved radially outwards and then turns freely about the circular line—shown in broken lines—around this coupling sleeve without engaging with it.

Figure 3:
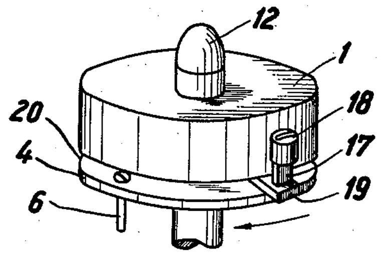
FIG. 3 shows in perspective view a further example of the principle of the invention with the end of the double lever—now bent to a right angle—taking friction coupling effect on the outside of the spool or turn-table disc to bring about the friction coupling effect.

Finally, FIG. 3 shows in a purely schematic way another example. Here, 1 is again the spool or turn-table disc in the form of a hollow cylinder open at the bottom. The intermediate disc 4 is underneath it. The second end of the double lever—mostly fitted within the cylindrical spool disc 1—projects with its end 19 through the slit 20 between parts 1 and 4. Part 17 bent upwards to an angle on this lever end 19 has a friction lining 18 which, on movement in the wind-up direction (as shown by the arrow), exerts a friction coupling effect on the outer surface of this hollow cylinder 1 and thus engages with this spool disc 1 in the direction of drive. With the movement in the opposite direction (tape wind-off), the lever end 19 with the bent part 17 moves radially outwards so that the friction lining 18 can no longer rest on the outer surface of 1 and accordingly a friction coupling effect can then no longer occur. 12 is again the corresponding spindle on which the spool disc 1 runs and 6 is again the pin coupled to the drive disc 2 (not shown in FIG. 3) with this pin providing for the engagement of the disc 4 and the double lever.

The chief advantage of the device according to the invention lies in the special, mechanically simple construction of the coupling between drive and spool disc. Here, too, with the use of the coupling sleeve, a simple adjustment of the friction coupling is possible.

Furthermore it is most advantageous that the friction lining is arranged in perpendicular direction and in parallel to the spindle of the structure. Thus the friction coupling effect is not dependent on the weight of the spool or turn-table disc and the sound carrier spool.

What I claim is:

1. In a magnetic sound recording and reproducing device in combination a turn-table disc, a driving disc, a spindle around which said turn-table disc and said driving disc are rotatably arranged, a friction coupling element between said driving disc and said turn-table disc, further coupling means for selectively coupling said driving disc and said turn-table disc through said friction coupling element, a friction lining arranged between said friction coupling element and said turn-table disc, said friction coupling element having the form of a coupling sleeve for coupling said turn-table disc and said driving disc through said friction lining, said friction lining lying concentric to said spindle.

2. In a magnetic sound recording and reproducing device in combination a turn-table disc, a driving disc, a spindle around which said turn-table and said driving disc are rotatably arranged, a friction coupling element between said driving disc and said turn-table disc, further coupling means for selectively coupling said driving disc and said turn-table disc through said friction coupling element, a friction lining arranged between said friction coupling element and said turn-table disc, said turn-table disc having a hub embracing said spindle, said friction coupling element having the form of a coupling sleeve consisting of two clamps embracing said hub, said friction lining being coaxially arranged around said spindle and embracing the hub of said turn-table disc 3. In a magnetic sound recording and reproducing device in combination a turn-table disc, a driving disc, a spindle around which said turn-table disc and said driving disc are rotatably arranged, a friction coupling element between said driving disc and said turn-table disc, further coupling means for selectively coupling said driving disc and said turn-table disc through said friction coupling element, a friction lining arranged between said friction coupling element and said turn-table disc, said friction coupling element carrying the friction lining being arranged outside the circumference of said turn-table disc and attached to said further coupling means thus being adapted to be pressed through the coupling movement of said further coupling means to the outer surface of said turn-table disc, said friction lining lying in parallel to said spindle and to the outer wall of said turn-table disc respectively.

4. In a magnetic sound recording and reproducing device in combination a turn-table disc, a driving disc, a spindle around which said turn-table and said driving disc are rotatably arranged, a friction coupling element between said driving disc and said turn-table disc, further coupling means for selectively coupling said driving disc and said turn-table disc through said friction coupling element, a friction lining arranged between said friction coupling element and said turn-table disc, and a steel jacket, said turn-table disc having a hub embracing said spindle, said steel jacket being applied to the external surface of the hub of said turn-table, said friction coupling element having the form of a coupling sleeve consisting of two clamps embracing said hub, said friction lining being coaxially arranged around said spindle and embracing the hub of said turn-table disc.

5. In a magnetic sound recording and reproducing device in combination a turn-table disc, a driving disc, a spindle around which said turn-table and said driving disc are rotatably arranged, a friction coupling element between said driving disc and said turn-table disc, further coupling means for selectively coupling said driving disc and said turn-table disc through said friction coupling element, a friction lining arranged between said friction coupling element and said turn-table disc, a screw and a spring for holding said friction coupling element on said turn-table disc, said turn-table disc having a hub embracing said spindle, said friction coupling element having the form of a coupling sleeve consisting of two clamps embracing said hub and being adjustably connected with each other by means of said screw and said spring, said screw adjustably connecting said clamps at their one end, and said spring elastically connecting said clamps at their other end, said friction lining being coaxially arranged around said spindle and embracing the hub of said turn-table.

References Cited in the file of this patent

UNITED STATES PATENTS

| | | |
|---|---|---|
| 2,144,211 | Vollenweider | Jan. 17, 1939 |
| 2,731,211 | Moquist | Jan. 17, 1956 |
| 2,872,004 | Barker et al. | Feb. 3, 1959 |